(12) United States Patent
Zhu (10) Patent No.: US 7,934,079 B2
(45) Date of Patent: Apr. 26, 2011

(54) PROCESSOR AND ITS INSTRUCTION ISSUE METHOD

(75) Inventor: Xia Zhu, Shanghai (CN)

(73) Assignee: NXP B.V., Eindhoven (NL)

( * ) Notice: Subject to any disclaimer, the term of this patent is extended or adjusted under 35 U.S.C. 154(b) by 660 days.

(21) Appl. No.: 11/813,991

(22) PCT Filed: Jan. 10, 2006

(86) PCT No.: PCT/IB2006/050082
§ 371 (c)(1),
(2), (4) Date: Jan. 8, 2008

(87) PCT Pub. No.: WO2006/075286
PCT Pub. Date: Jul. 20, 2006

(65) Prior Publication Data
US 2008/0209174 A1      Aug. 28, 2008

(30) Foreign Application Priority Data
Jan. 13, 2005   (CN) .......................... 2005 1 0005709

(51) Int. Cl.
G06F 9/30   (2006.01)
G06F 9/34   (2006.01)

(52) U.S. Cl. ...................................... 712/220; 712/213

(58) Field of Classification Search .................. 712/214, 712/215, 220, 213
See application file for complete search history.

(56) References Cited

U.S. PATENT DOCUMENTS

| | | | |
|---|---|---|---|
| 4,736,288 A * | 4/1988 | Shintani et al. ............... | 712/217 |
| 5,850,552 A | 12/1998 | Odani et al. | |
| 6,101,597 A | 8/2000 | Colwell et al. | |
| 6,119,219 A * | 9/2000 | Webb et al. .................... | 712/227 |
| 6,161,173 A | 12/2000 | Krishna et al. | |
| 6,249,862 B1 | 6/2001 | Chinnakonda et al. | |
| 6,393,550 B1 * | 5/2002 | Fetterman et al. ............ | 712/214 |
| 6,601,162 B1 * | 7/2003 | Teruyama ..................... | 712/239 |
| 7,617,385 B2 * | 11/2009 | Indukuru et al. ............. | 712/220 |
| 2002/0032558 A1 | 3/2002 | Strong et al. | |
| 2002/0166112 A1 * | 11/2002 | Martin et al. ................. | 717/124 |

FOREIGN PATENT DOCUMENTS

| | | |
|---|---|---|
| CN | 1160627 C | 8/2004 |
| CN | 1534462 A | 10/2004 |
| EP | 1 462 934 A1 | 9/2004 |
| WO | 01/50249 A2 | 7/2001 |

OTHER PUBLICATIONS

Stark, J; et al "On Pipelining Dynamic Instruction Scheduling Logic" Micro-33. Proceedings of the 33rd Annual ACM/IEEE International Symposium on Microarchitecture. IEEE Computer Society, Dec. 10, 2000, pp. 57-66.

(Continued)

Primary Examiner — Daniel Pan (57) ABSTRACT

An instruction issue method for use in a pipelined processor, comprising the steps of: decoding an instruction to be processed to get a type of the instruction; computing the number of cycles to be occupied at execution stage for the instruction, according to the type of the instruction; marking a target operand of the instruction as acquirable in a predefined cycle before the instruction enters write-back stage, according to the number of cycles, so that subsequent instructions taking the target operand as their source operands perform subsequent operations according to the case that the target operand is acquirable.

16 Claims, 4 Drawing Sheets

OTHER PUBLICATIONS

Brown, M. D; et al "Select-Free Instruction Scheduling Logic" Micro-34. Proceedings of the 34th Annual ACM/IEEE International Symposium on Microarchitecture. IEEE Computer Society, Dec. 1, 2001, pp. 204-213.

Raasch, S. E; et al "A Scalable Instruction Queue Design Using Dependence Chains" Proceedings of the 29th International Symposium on Computer Achitecture. ISCA 2002. May 25, 2002, pp. 318-329.

International Preliminary Report on Patentability for Int'l. Patent Appln. No. PCT/IB2006/050082 (Jul. 17, 2007).

* cited by examiner

PROCESSOR AND ITS INSTRUCTION ISSUE METHOD

FIELD OF THE INVENTION

The present invention relates to a processor, and, more particularly, to an instruction issue method it uses and a corresponding instruction issue circuit thereof.

BACKGROUND OF THE INVENTION

With development of electronic technologies, it's becoming one of the hottest issues in computer architecture research as to how to further increase data processing speed of a processor.

The average number of IPC (Instructions Committed per Cycle) is an important measure for assessing data processing speed of a processor. An ordinary pipelined scalar processor can reach a maximum processing speed of one instruction per cycle (i.e. IPC=1). While in most cases, IPC of a pipelined scalar processor is less than 1.

A pipelined superscalar processor is now applied to improve the processor performance. providing in the pipelined superscalar processor multiple instruction-fetching units, multiple instruction-decoding units, multiple functional units for performing the corresponding algorithms and multiple result-writing units, in a cycle, by using dynamic schedule, multiple instructions can be moved from one pipeline stage to the next one, so the pipelined superscalar processor can execute multiple instructions per cycle (IPC>1).

Figure 1:
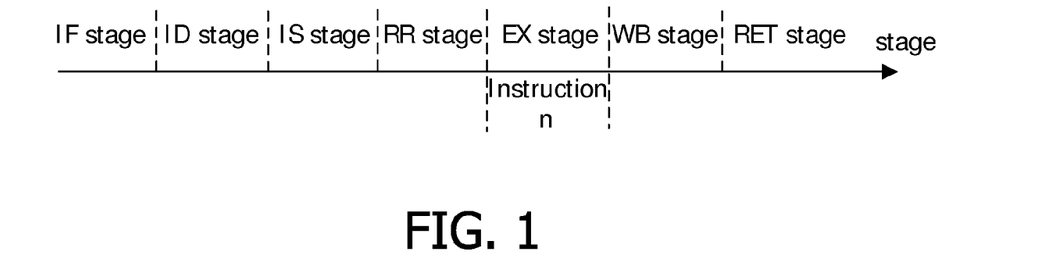
FIG. 1 schematically illustrates an instruction at execution stage on a pipeline.

FIG. 1 schematically illustrates an instruction n in the instruction-execution stage of seven stages representing a pipeline. The seven stages are IF (Instruction Fetch) stage, ID (Instruction Decode & Rename) stage, IS (Instruction Issue) stage, RR (Read Register) stage, EX (Instruction Execution) stage, WB (Write Back) stage and RET (Instruction Retirement) stage, respectively.

A brief description will be given below to the operating principle of the superscalar processor, by taking the seven-stage pipeline as an example.

Firstly, multiple instruction-fetching units fetch multiple instructions simultaneously from the instruction cache at IF stage; secondly, the corresponding instruction-decoding units decode and rename the multiple decoding instructions respectively at ID stage, and place the multiple decoded instructions into an issue queue; then, a determination procedure (or issue logic determination procedure) is performed to the multiple decoded instructions at IS stage, to determine whether each decoded instruction in the issue queue can be issued to enter RR stage.

In order to improve the IPC performance of pipelined superscalar processors, the decoded instructions in the issue queue should be issued simultaneously as many as possible, so as to execute more instructions at subsequent EX stage.

The factors affecting whether a decoded instruction can be issued mainly involve whether the source operands required in executing the decoded instruction are ready and whether the functional units (e.g., float adding units and multiplying/dividing units) are available. Corresponding to the two factors, the issue logic determination procedure to be executed at the IS stage is composed of wakeup logic determination procedure and select logic determination procedure.

1. Wakeup Logic Determination Procedure

Usually, a set of a group of instructions to be detected for simultaneous execution in the issue queue is called as a window (or issue window). On the pipelined superscalar processor, the source operands of the instructions to be detected in the issue window are determined by the target operands generated from the executed instructions on the pipeline. Accordingly, when the results of the instructions executed (i.e., the target operands of the executed instructions) at EX stage on the pipeline are broadcasted over a data bus in every cycle, each instruction to be detected in the issue window compares its own source operands with the broadcasted target operands respectively, to judge whether the broadcasted target operands are the source operands it requires. This comparison determination procedure is the wakeup logic determination procedure.

When one of the source operands required by the instruction to be detected corresponds with the broadcasted target operands, the corresponding tag, which indicating whether the source operand of the instruction to be detected is ready, is set to "acquirable"; when all source operands required by the instruction to be detected are ready, i.e. the tags of all source operands are "acquirable", the instruction to be detected enters to-be-issued status.

During execution of the wakeup logic determination procedure, the larger the issue window is, the more is the number of the instructions to be detected, and the higher is the possibility of the instruction entering to-be-issued status, which is in favor of increasing the issue number of the decoded instructions in the issue queue. However, if the size of the issue window is increased blindly, the length of the data bus for broadcasting target operands needs to be longer accordingly, which thus results in prolonging of the latency brought by broadcasting the target operands. Furthermore, with the number of the instructions to be detected in the issue window increasing, the number of comparison operations to be executed increases too, which further prolongs the time for executing the wakeup logic determination procedure. Thus, the size of the issue window should be set properly to increase the instruction issue number.

2. Select Logic Determination Procedure

Each instruction entering to-be-issued status after the wakeup logic determination procedure needs the select logic determination procedure before entering the next RR stage. The reasons are: (1) it's likely that the number of instructions entering to-be-issued status is more than the number of the functional units in the processor; and (2) some instructions can only be executed by a subset of the functional units, for example, if there is only one multiplier in the processor, all multiplication operations have to be executed by this multiplier. Consequently, if instructions are issued selectively from the instructions in to-be-issued status through the select logic determination procedure, resource conflict at subsequent EX stage can be avoided effectively.

Further, only after an instruction already entering to-be-issued status is issued after the select logic determination procedure, can a subsequent instruction dependent on the instruction (for example, the source operands required for execution of the subsequent instruction are from the target operands generated by executing the issued instruction) enable its wakeup logic determination procedure. On the pipelined superscalar processor, the scheme known as "Critical Loops" composed of wakeup logic determination procedure and select logic determination procedure can avoid data conflicts between dependent instructions effectively.

As to the instructions issued simultaneously at the IS stage through the above wakeup logic determination procedure and select logic determination procedure, they read their respective source operands from the corresponding physical registers in the register file at RR stage, and then execute the corresponding functional operation at the following EX stage in the functional units selected during the select logic determination procedure, wherein different operations may need different cycles. For example, the cycle required for executing an integer adding operation is usually shorter than that for a float multiplication operation. Therefore, instructions moving simultaneously from RR stage to EX stage may experience different cycles to get the result of instruction operation generated at EX stage.

After obtaining the operation result at its respective EX stage, each executed instruction stores the operation result (i.e. target operands) into the corresponding physical registers in the register file at WB stage respectively, and broadcasts the target operands over the above data bus, for subsequent instructions at IS stage in the issue window on the pipeline to execute wakeup logic determination procedure.

After WB stage, an executed instruction will finally terminate all its operation procedures on the pipeline at RET stage.

It can easily be seen from the above description that it's obviously an effective way to improve IPC by increasing the number of the decoded instructions to be detected in the issue window. But as stated above, with the number of the decoded instructions increasing, the time for executing wakeup logic determination procedure also increase remarkably, which undoubtedly will lead to deterioration in the IPC performance.

It is, therefore, necessary to put forward a novel method for issuing instruction to solve this contradiction. And this is the aim of the present invention.

OBJECT AND SUMMARY OF THE INVENTION

One of the objects of the present invention is to provide an instruction issue method, with which the times of executing wakeup logic determination procedure are decreased so as to improve the IPC performance of the processor.

There is provided with an instruction issue method for use in a pipelined processor according to the present invention, comprising the steps of: decoding an instruction to be processed, to get a type of the instruction; computing the number of cycles to be occupied at execution stage for the instruction, according to the type of the instruction; marking a target operand of the instruction as acquirable in a predefined cycle before the instruction enters write-back stage, according to the number of cycles, so that subsequent instructions taking the target operand as their source operands perform subsequent operations according to the case that the target operand is acquirable.

There is provided with an instruction issue apparatus for use in a pipelined processor according to the present invention, comprising: a decoding unit, for decoding an instruction to be processed, to get a type of the instruction; a computing unit, for computing the number of cycles to be occupied at execution stage for the instruction, according to the type of the instruction; a control unit, for marking a target operand of the instruction as acquirable in a predefined cycle before the instruction enters write-back stage, according to the number of cycles, so that subsequent instructions taking the target operand as their source operands perform subsequent operations according to the case that the target operand is acquirable.

There is provided with a pipelined processor according to the present invention, comprising: a decoding unit, for decoding an instruction to be processed, to get a type of the instruction; a computing unit, for computing the number of cycles to be occupied at execution stage for the instruction, according to the type of the instruction; a control unit, for marking a target operand of the instruction as acquirable in a predefined cycle before the instruction enters WB stage, according to the number of cycles, so that subsequent instructions taking the target operand as their source operands perform subsequent operations according to the case that the target operand is acquirable; an executing unit, for executing corresponding operations for the instruction, to generate the target operand of the instruction.

The above and other objects, features and other advantages of the present invention will be more clearly understood from the following detailed description taken in conjunction with the accompanying drawings.

BRIEF DESCRIPTION OF THE DRAWINGS

For a detailed description of the preferred embodiments of the invention, reference will now be made to the accompanying drawings in which.

Throughout the drawings, the same or similar elements are denoted by the same reference numerals.

DETAILED DESCRIPTION OF THE INVENTION

With regard to the instruction issue method as proposed in the present invention, at first, the number of cycles to be occupied at EX stage by a decoded instruction is computed according to the operation type of the decoded instruction; and the cycles occupied are then counted when the decoded instruction is issued to RR stage, and subsequent instructions dependent on the instruction still in the issue queue are allowed to enter to-be-issued status in a cycle before the last cycle of the EX stage rather than the subsequent instructions are allowed to enter to-be-issued status only after entering WB stage.

Figure 2A:
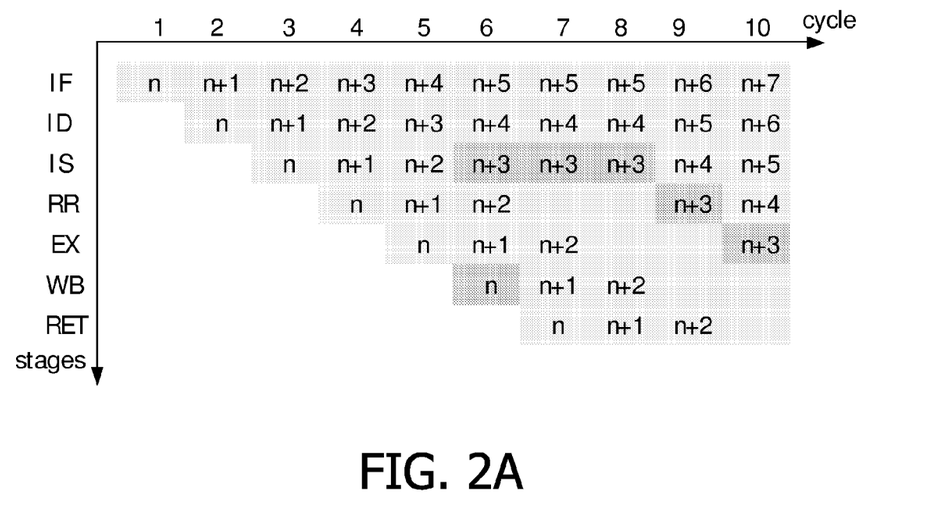
FIG. 2A schematically illustrates multiple instructions on a pipeline of a conventional superscalar processor.
Figure 2B:
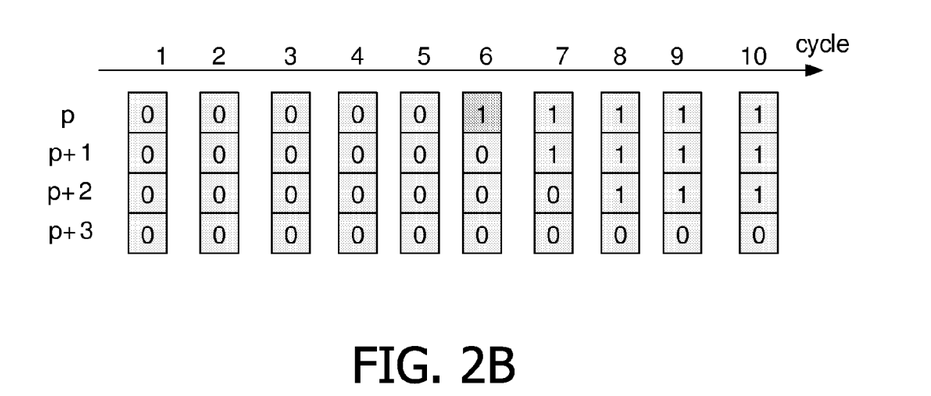
FIG. 2B schematically illustrates the tags corresponding to some instructions of FIG. 2A in the lookup table.

To better clarify the instruction issue method as proposed in the present invention, an existing microprocessor, MIPS R100, that can execute millions of instructions per second, will be taken as an example, to describe the execution procedure of the wakeup logic in the superscalar processor, in conjunction with FIG. 2A and FIG. 2B.

FIG. 2A schematically illustrates instructions n to n+7 at each stage on the pipeline in 10 cycles respectively, wherein the source operands needed by instruction n+3 are from the target operands of previously executed instructions n+1 and n+2, respectively.

FIG. 2B schematically illustrates a group of tags in a lookup table arranged in the processor. Wherein, if it's assumed that the target operands of instructions n, n+1, n+2 and n+3 are stored in physical registers p, p+1, p+2 and p+3 respectively, the group of tags are respectively used for indicating whether the target operands of instructions n, n+1, n+2 and n+3 have been stored in the corresponding physical registers. It's assumed that the tag being 0 means that the corresponding target operand is not stored in the corresponding physical register yet (i.e. the corresponding target operand is not acquirable), and conversely, the tag being 1 means that the corresponding target operand has been stored in the corresponding physical register (i.e. the corresponding target operand is acquirable). When implemented in hardware, the lookup table may be a (m×1)-bit multi-port RAM (Random Access Memory), wherein m is the number of the physical registers in the register file.

Generally, when an instruction is dispatched into the issue queue, at the dispatch time, the corresponding tags in the lookup table are all in "unacquirable" status. The status will be maintained until the tag is set to "acquirable" status after the instruction executes the corresponding operation through EX stage when the operation result (target operands) is written into the corresponding physical registers in the register file at WB stage. Thus, the subsequent instructions requiring the operands enter to-be-issued status when all source operands are ready, based on the indication of the tag, according to the operating principle of the above superscalar processor, and is issued to RR stage through select logic determination procedure.

As shown in FIG. 2A and FIG. 2B, before each instruction enters its respective WB stage, its corresponding tag is 0. When the instructions n, n+1 and n+2 enter WB stage in the $6^{th}$, $7^{th}$, $8^{th}$ cycles respectively, the corresponding tags are set to 1 respectively.

Whether an instruction is allowed to be issued is determined by whether the tags corresponding to the source operands required by the instruction have been marked as "acquirable" in the lookup table, and further, whether the source operands are "acquirable" is determined by whether previously executed instructions dependent have already written the target operands into the target registers at WB stage. Accordingly, as shown in FIG. 2B, the source operands of instruction n+3 are from instructions n+1 and n+2 respectively, and it can be detected through wakeup logic determination procedure that all the source operands are obtained until the $8^{th}$ cycle, and after that instruction n+3 enters to-be-issued status and is allowed to be issued through select logic determination procedure. So, instruction n+3 has to stay at IS stage in both the $7^{th}$ and $8^{th}$ cycles, and two wakeup logic determination procedures are performed respectively in the $7^{th}$ cycle when instruction n+1 generates target operands and in the $8^{th}$ cycle when instruction n+2 generates target operands, to obtain information about that the corresponding source operands are "acquirable" in the lookup table.

But according to the design principle of bypass circuit commonly used in superscalar processors, if instructions n+1 and n=2 are both instructions that can be executed within one cycle, instruction n+3 can enter RR stage in the $7^{th}$ cycle (i.e. instruction n+3 at IS stage is allowed to be issued in the $6^{th}$ cycle). Specifically, when instruction n+3 enters RR stage in the $7^{th}$ cycle, since instruction n+1 has entered WB stage, instruction n+3 can obtain the target operands generated by instruction n+1 through reading the value of the corresponding physical registers in the register file; while although instruction n+2 is still at EX stage, instruction n+3 can obtain the target operands generated by instruction n+2 through the bypass circuit. Therefore, instruction n+3 can smoothly execute corresponding operations in the $8^{th}$ cycle after obtaining the required source operands at RR stage in this manner, without waiting to enter EX stage until the $10^{th}$ cycle.

It can be seen herein that if only instruction n+3 at IS stage is no longer solely dependent on the indication of the tag in the lookup table when it's determined whether it can be issued in the cases of FIG. 2A and FIG. 2B, i.e.: no longer solely dependent on the operation result written back by previous relevant instructions at its WB stage, instruction n+3 certainly can enter RR stage earlier, and meanwhile, instruction n+1 and n+2 are certainly of no obstacle for allowing instruction n+3 to enter to-be-issued status and to be issued to RR stage through the select logic determination procedure even in the case of not entering WB stage yet.

On the basis of this point, there is provided with a novel instruction issue method in the present invention. In this method, an issue enable table is established, the issue enable table capable of reflecting the information required by each instruction at IS stage duly; and when an instruction at IS stage performs wakeup logic determination procedure, whether the instruction is allowed to be issued can be determined by retrieving the issue enable table. Compared with the conventional instruction issue method by retrieving the lookup table, the present invention decreases the times for executing wakeup logic operations and thus lower the latency brought by executing wakeup logic operations.

Detailed description will be given blow to the instruction issue method as proposed in the present invention, in conjunction with FIG. 3A and FIG. 3B.

Figure 3A:
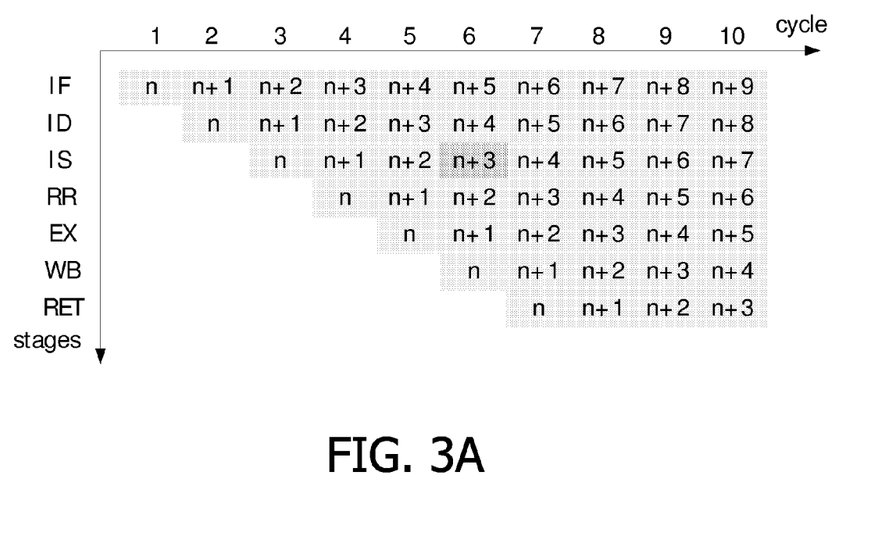
FIG. 3A schematically illustrates multiple instructions on the pipeline of a superscalar processor according to an embodiment of the present invention.

FIG. 3A illustrates instructions n to n+9 in 10 cycles at each stage on the pipeline according to the instruction issue method of the present invention, wherein the source operands of instruction n+3 are also target operands from the previously executed instructions n+1 and n+2 respectively.

Figure 3B:
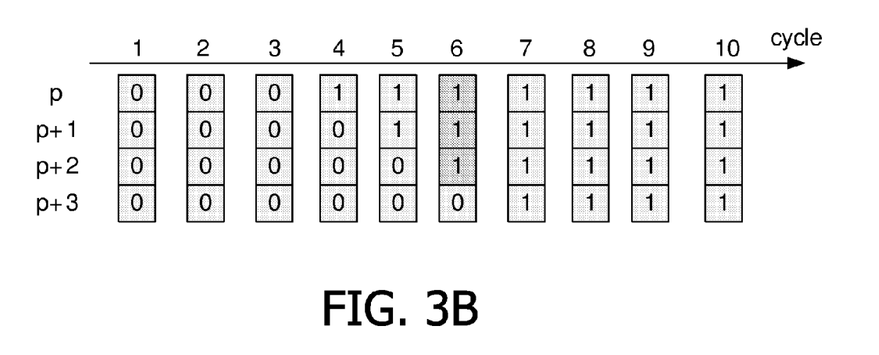
FIG. 3B schematically illustrates the tags corresponding to some instructions of FIG. 3A in the issue enable table.

FIG. 3B illustrates a group of tags in the issue enable table newly arranged in the processor according to the instruction issue method of the present invention. The issue enable table can also be realized by using a mx1-bit multi-port RAM, wherein m corresponds to the number of physical registers in the register file.

In the issue enable table as shown in FIG. 3B, the value of each tag is not used to indicate whether corresponding target operand has been written into the corresponding physical register, but to indicate that an instruction previously issued into RR stage disables the restrictions on subsequent instructions dependent on the instruction and allows the subsequent instructions to enter to-be-issued status. Whether the subsequent instructions can enter to-be-issued status is determined by whether all previous instructions providing source operands to the subsequent instructions allow the subsequent instructions to enter to-be-issued status. And whether the subsequent instructions can be issued after entering to-be-issued status is determined by further performing the select logic determination procedure. In addition, if the indication of the corresponding tag is 1, it means that the instruction allows the relevant subsequent instructions to enter to-be-issued status, that is, when the target operands of the previously issued instruction are used by its subsequent instructions as source operands, if the tag corresponding to the target operand in the issue enable table is 1, the source operand required by the subsequent instruction is viewed in "acquirable" status.

According to an preferred embodiment of the present invention, an instruction previously issued into RR stage should set its tag in the issue enable table as early as possible, to allow relevant subsequent instructions to enter to-be-issued status, thus to increase the possibility of allowing the subsequent instructions to be issued and save unnecessary wakeup logic operations.

After being decoded, an instruction can precisely determine how many cycles are needed by the instruction to produce operation result at EX stage according to the operation type shown in the decoded instruction. For example, in the functional units of a common processor, generally only one cycle is needed to execute an operation of integer adding or subtracting operation, while for float multiplication or dividing operation, several cycles are required usually. Processors of different types need different number of cycles to execute float multiplication or dividing operation, but every processor executes float multiplication or dividing operation in relatively fixed number of cycles. Thus, an instruction previously issued into RR stage can set the corresponding tag in the issue enable table no earlier than a cycle before the last cycle at EX stage, which will be explained in the following section.

According to the method of the present invention as shown in FIG. 3A and FIG. 3B, since only one cycle is needed to complete the execution of instruction n (i.e. there is only one cycle at EX stage), when instruction n enters RR stage in a cycle (the $4^{th}$ cycle) before the cycle, the corresponding tag in the issue enable table can be set to 1, so that the subsequent instructions at IS stage, which are dependent on the instruction n, can enter to-be-issued status in the $4^{th}$ cycle shaking off restrictions from instruction n. If each related previously issued instruction, which provides source operands to the subsequent instructions, allows the subsequent instructions to enter to-be-issued status in the $4^{th}$ cycle and the functional units for executing the subsequent instructions are available through select logic determination procedure, the subsequent instructions can be issued in the $4^{th}$ cycle.

Similarly, instructions n+1 and n+2 set their respective tags in the issue enable table to 1 in the $5^{th}$ and $6^{th}$ cycle.

As stated above, instruction n+3 is dependent on instructions n+1 and n+2, that is, the source operands of instruction n+3 are from the target operands of instructions n+1 and n+2 respectively. In the $6^{th}$ cycle, since the tags corresponding to instructions n+1 and n+2 are both 1, although both instruction n+1 at EX stage and instruction n+2 at RR stage at this time have not entered into WB stage yet and their target operands have not been stored into the corresponding physical registers in the register file, instructions n+1 and n+2 won't prevent instruction n+3 from entering to-be-issued status according to the method of the present invention.

If instruction n+3 is allowed to be issued into RR stage In the $6^{th}$ cycle through select logic determination procedure, instruction n+3 enters RR stage in the $7^{th}$ cycle, instructions n+1 and n+2 enter WB stage and EX stage on the pipeline respectively. At this time, instruction n+3 at RR stage obtains a required source operand by reading the value in the physical register corresponding to instruction n+1 and obtain the operation result of executing instruction n+2 through bypass circuit to get another source operand, so as to use the two source operands in the $8^{th}$ cycle to perform the corresponding operations in the functional units smoothly.

Compared with FIG. 2A, instruction n+3 enters RR stage and EX stage earlier than 2 cycles respectively, which saves the bubble of instruction n+3 at IS stage on the pipeline and the latency and power consumption brought by performing wakeup logic operations in the bubble.

On the other hand, if instruction n+3 is not allowed to enter RR stage through select logic determination procedure in the $6^{th}$ cycle, instruction n+3 has to wait in the $7^{th}$ cycle and thus the $7^{th}$ cycle becomes a bubble. In this bubble, the wakeup logic determination procedure of instruction n+3 can be performed through referring again to the corresponding tags in the issue enable table. Alternatively, the wakeup logic determination procedure of instruction n+3 can be performed through referring to the conventional lookup table as above and the select logic determination procedure is continued after completing the wakeup logic operations, to determine whether instruction n+3 is allowed for issuing to RR stage in the $7^{th}$ cycle.

If instruction n+3 is allowed to be issued to RR stage in the $7^{th}$ cycle, instruction n+1 has already entered RET stage and instruction n+2 has already entered WB stage in the $8^{th}$ cycle. At this time, instruction n+3 at RR stage obtains the two source operands required by reading the values in the physical registers corresponding to instruction n+1 and n+2, and performs the corresponding operations in the functional units in the following $9^{th}$ cycle by using the two source operands.

In the above FIG. 3A, the exemplary instructions n, n+1 and n+3 are all instructions that can be executed within one cycle. So, according to the present invention, these instructions allow relevant subsequent instructions to be in to-be-issued status in their respective RR stage. For an instruction whose execution needs several cycles, the following method is used in order to disable the instruction' restriction on subsequent instruction's entering to-be-issued status duly.

Figure 4:
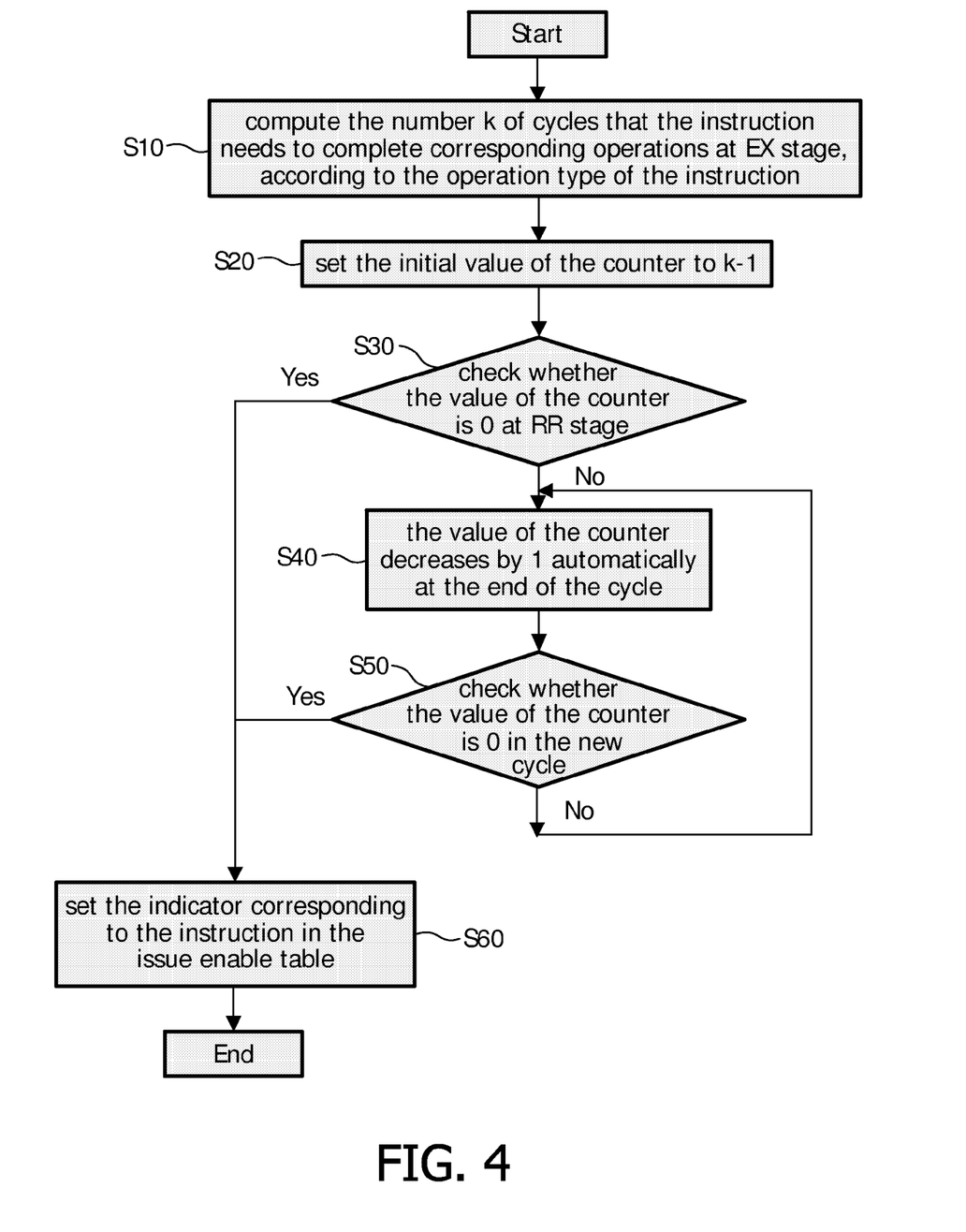
FIG. 4 shows the flowchart of an embodiment of the instruction issue method according the present invention.

Referring to FIG. 4, the number of cycles that the instruction needs to complete at EX stage corresponding operations is computed firstly, according to the operation type of the instruction (step S10). For example, the instruction at EX stage needs k cycles to get the target operands.

Then, a counter is set for the instruction, and the value of the counter is set to k−1 initially (step S20).

When the instruction enters RR stage, check whether the value of the counter is 0 (step S30). If the value is 0, it means the instruction is one that can be executed within one cycle, then the tag corresponding to the instruction in the issue enable table is set through the operation procedure shown with reference to FIG. 3A and FIG. 3B (step S60). If the value is not 0, the value of the counter decreases by 1 automatically at the end of the cycle (step S40).

When entering the next new cycle, check whether the decreased value of the counter is 0 (step S50). If the value of the counter is 0, step S60 is performed to set the tag corresponding to the instruction in the issue enable table; if the value of the counter is not 0, step S40 is continued to decrease the value of the counter by 1 automatically at the end of the cycle.

With regard to a superscalar processor, the issue logic determination procedure composed of wakeup logic determination procedure and select logic determination procedure should be executed within one cycle so as to avoid insertion of unnecessary bubbles. Therefore, although the instruction sets the corresponding tag in the issue enable table in the $(k-1)^{th}$ cycle, that is, allowing relevant subsequent instructions to enter to-be-issued status to perform select logic determination procedure, the instruction actually has disabled its restriction on the subsequent instructions from enabling wakeup logic determination procedure in the $(k-2)^{th}$ cycle, i.e. when the counter decreases by 1. Accordingly, when the $(k-1)^{th}$ cycle arrives, the subsequent instructions executes wakeup logic determination procedure to search for the tags corresponding to all previously issued instructions related to the subsequent instructions according to the indication of the tag in the issue enable table, so as to determine whether the subsequent instructions can enter to-be-issued status to perform select logic determination procedure.

Table.1 lists instructions requiring different number of cycles to be completed, how they disable restrictions on relevant subsequent instructions from enabling wakeup logic determination procedure in a certain cycle when being issued to RR stage according to the initial value of a counter set based on the operation type and how they set the corresponding tags in the issue enable table in the corresponding cycles.

TABLE 1

Instructions requiring different number of cycles to be completed
and the related operations in the corresponding cycles.

| Number of cycles required for executing an instruction | The initial value of the counter when entering RR stage | When will the instruction disable restriction on related subsequent instructions from enabling wakeup logic determination procedure | When will the tag corresponding to the instruction in issue enable table be set |
|---|---|---|---|
| 1 | 0 | IS stage, when the instruction is allowed to be issued through select logic determination procedure | RR stage |
| 2 | 1 | RR stage | $1^{st}$ cycle in EX stage |
| 3 | 2 | $1^{st}$ cycle in EX stage | $2^{nd}$ cycle in EX stage |
| ... | ... | ... | ... |
| k | k-1 | $(k-2)^{th}$ cycle in EX stage | $(k-1)^{th}$ cycle in EX stage |

In the description to the above preferred embodiment of the present invention, the tag of the instruction in the issue enable table is set in the $(k-1)^{th}$ cycle of the EX stage, to allow related subsequent instructions to enter to-be-issued status. Alternatively in another embodiment of the present invention, the tag corresponding to the instruction in the issue enable table is set in the $k^{th}$ cycle of the EX stage, to allow related subsequent instructions to enter to-be-issued status. Compared with existing processors that update the tags in the lookup table at WB stage, even if the corresponding tags in the issue enable table are updated in the $k^{th}$ cycle, it can still effectively decrease the possible bubbles generated when an instruction to be detected at IS stage on the pipeline waits its source operands.

The above instruction issue method of the present invention can be implemented in software or hardware, or in combination of both.

When implemented in hardware, in an instruction issue circuit, the decoding units, the memory for storing the issue enable table, the reading unit for reading the value of the tags in the issue enable table, the detection unit for detecting whether the functional units are available in execution of the issue logic procedure, and the issue unit for issuing instructions to RR stage, can all use components same as or similar to those in existing microprocessors.

Added into the instruction issue circuit of the present invention are a computing unit for computing the number of cycles required for performing the operation of the instruction according to the operation type of the decoded instruction, a counter (the initial value and working principle of the counter are the same as those in the above instruction issue method) and a control unit for setting the value of the corresponding register in the memory when the value of the counter decreases to 0. Therefore, the instruction issue circuit according to the present invention is easy to be applied, without making significant modifications to existing superscalar processors.

The operations to be executed by various components in the instruction issue circuit of the present invention are mentioned in the above description to the proposed instruction issue method, and thus the description is omitted herein.

ADVANTAGES OF THE INVENTION

Regarding the descriptions above to the instruction issue method and instruction issue circuit of the present invention, it can be seen easily that the lookup table in the prior art is replaced with the issue enable table. When determining whether an instruction to be detected in the issue queue is allowed to enter to-be-issued status, we no longer rely on whether the executed instructions have entered WB stage and written the target operands into the physical registers. The previously issued instructions set the corresponding tags in the issue enable table in the corresponding cycle before entering WB stage, to disable the previous instructions restrictions on whether the instructions to be detected are allowed to enter to-be-issued status. Compared with existing superscalar processors, this invention thus reduces the possible bubbles generated when an instruction to be detected at IS stage on the pipeline waits its source operands, and avoid the latency and power consumption brought by performing wakeup logic operations in the bubbles.

The instruction issue method and instruction issue circuit of the present invention are suitable for use in pipelined superscalar processors, and equally applicable to multithreading processors and embedded processors as well.

It is to be understood by those skilled in the art that the method and circuit as disclosed in this invention can be made of various modifications without departing from the spirit and scope of the invention as defined by the appended claims.

The invention claimed is:

1. An instruction issue method for use in a pipelined processor, comprising the steps of:
   decoding an instruction to be processed, to get a type of the instruction;
   computing a number of cycles to be occupied at execution stage for the instruction, according to the type of the instruction;
   marking a target operand of the instruction as acquirable in a predefined cycle before the instruction enters a writeback stage, the predefined cycle set according to the number of cycles; and
   entering, at least one subsequent instruction that uses the target operand as a source operand, into a to-be-issued stage in response to the marking of the target operand indicating that the target operand is acquirable.

2. The instruction issue method according to claim 1, wherein the predefined cycle is a cycle immediately before a cycle in which the target operand is generated.

3. The instruction issue method according to claim 1, wherein the predefined cycle is a cycle in which the target operand is generated.

4. The instruction issue method according to claim 1, wherein step of marking comprises: using an issue enable table to mark whether the target operand of the instruction is acquirable in the predefined cycle.

5. The instruction issue method according to claim 4, further comprising the steps of: detecting whether the target operand is related to the source operand of the subsequent instruction and whether or not the target operand is acquirable in the issue enable table, the detecting being responsive to the subsequent instruction entering an issue stage; and in response to the detection of whether the target operand is acquirable, entering the instruction into a to-be-issued status to perform a select logic determination procedure.

6. The instruction issue method according to claim 5, further comprising the steps of: detecting whether the target operand is stored in a register file when the instruction enters RR stage; obtaining the target operand for the instruction by bypassing the register file in response to the target operand not being detected as stored in the register file.

7. An instruction issue apparatus for use in a pipelined processor, comprising:
   a decoding unit, for decoding an instruction to be processed, to get a type of the instruction;
   a computing unit, for computing the number of cycles to be occupied at execution stage for the instruction, according to the type of the instruction;
   a control unit,
   for marking a target operand of the instruction as acquirable in a predefined cycle before the instruction enters a write-back stage, the predefined cycle identified according to the number of cycles, and
   for entering, into a to-be-issued stage, subsequent instructions that use the target operand as a source operand for performing subsequent operations and in response to the marking indicating that the target operand is acquirable.

8. The instruction issue apparatus according to claim 7, wherein the predefined cycle is a cycle immediately before a cycle in which the target operand is generated.

9. The instruction issue apparatus according to claim 7, wherein the predefined cycle is a cycle in which the target operand is generated.

10. The instruction issue apparatus according to claim 7, further comprising: a storing unit, for storing an issue enable table, in which each indicator indicates whether the target operand of an instruction is acquirable.

11. The instruction issue apparatus according to claim 10, further comprising: a reading unit, for reading whether the target operand is related to the source operand of the subsequent instruction and whether the target operand is acquirable in the issue enable table, in response to the subsequent instruction entering an issue stage; and wherein the control unit is configured, in response to reading that the target operand is acquirable, to control the entering of the subsequent instruction to a to-be-issued status to perform a select logic determination procedure.

12. A pipelined processor, comprising:
   a decoding unit, for decoding an instruction to be processed, and for identifying a type of the instruction;
   a computing unit, for computing a number of cycles to be occupied at execution stage for the instruction, according to the type of the instruction;
   a control unit, for marking a target operand of the instruction as acquirable in a predefined cycle before the instruction enters write-back stage, the predefined cycle set according to the number of cycles, and for entering subsequent instructions that use the target operand as a source operand of the subsequent instructions in response to the marking indicating that the target operand is acquirable;
   an executing unit, for executing corresponding operations for the instruction, to generate the target operand of the instruction.

13. The processor according to claim 12, wherein the predefined cycle is a cycle immediately before a cycle in which the target operand is generated.

14. The processor according to claim 12, wherein the predefined cycle is a cycle in which the target operand is generated.

15. The processor according to claim 12, further comprising: a storing unit, for storing an issue enable table, in which each indicator indicates whether the target operand of an instruction is acquirable.

16. The processor according to claim 15, further comprising: a reading unit, for reading whether the target operand is related to the source operand of the subsequent instruction and whether or not the target operand is indicated as acquirable in the issue enable table, the reading in response to the subsequent instruction entering an issue stage; and wherein the control unit is configured, in response to reading that the target operand is acquirable, entering the subsequent instruction into a to-be-issued status to perform a select logic determination procedure.

* * * * *